April 17, 1934. H. I. SHIMBERG 1,955,392
DEVICE FOR TEACHING TRIGONOMETRIC FUNCTIONS
Filed April 20, 1931
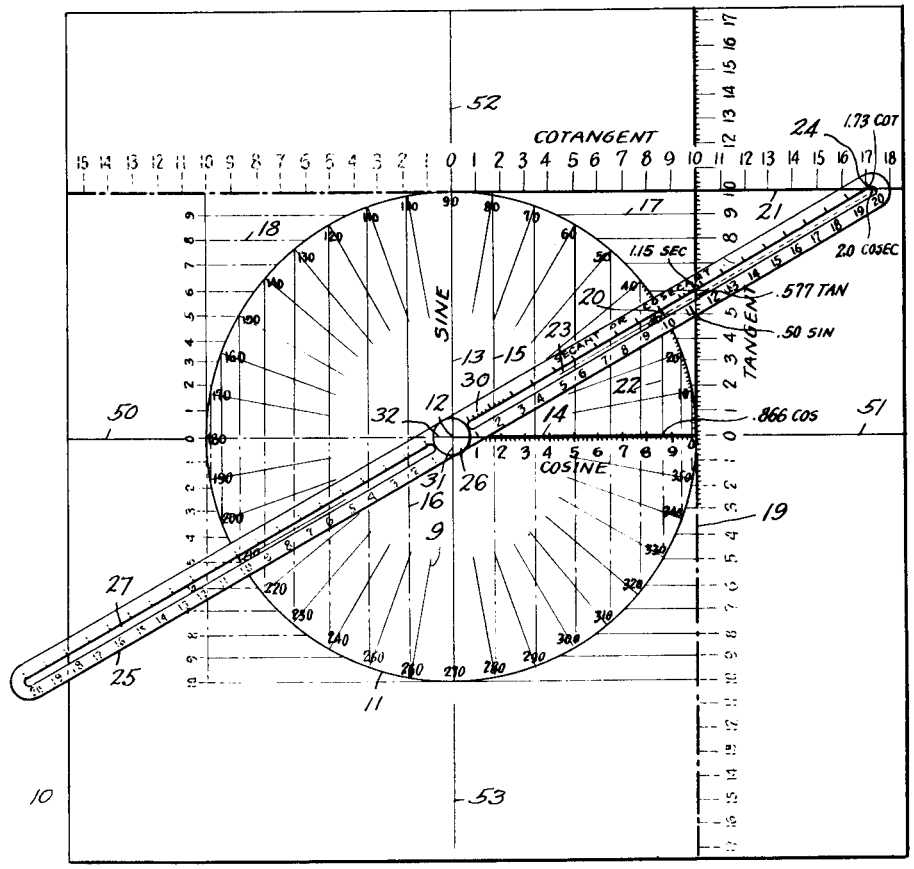
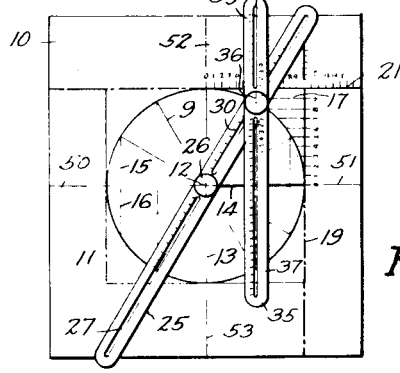
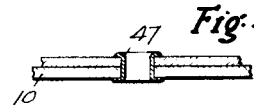
INVENTOR
Harold I. Shimberg
BY
ATTORNEY Patented Apr. 17, 1934

1,955,392

UNITED STATES PATENT OFFICE 1,955,392

DEVICE FOR TEACHING TRIGONOMETRIC FUNCTIONS

Harold I. Shimberg, New York, N. Y.

Application April 20, 1931, Serial No. 531,305

4 Claims. (Cl. 33—76)

This invention relates to devices for the teaching of trigonometric functions, and is intended to be used for demonstrating the changes in said functions as the angle changes, and for determining by inspection, as to quantity and algebraic sign, the value of the desired trigonometric line function of any angle.

Students of high school grades to whom trigonometry is taught, find it difficult to understand and remember not only what each of the functions of an angle is, but between what limits the functions vary on the variation of the angle, and when and how the signs of the functions vary on the variation of the angle, being sometimes positive and sometimes negative. Trigonometric tables giving natural functions of angles do not adequately illustrate such variation, nor do such tables help the student to grasp such variation, so well as does visual illustration. Students further find difficulty in understanding and remembering how and why the functions of a given angle are equal to the co-functions of a complementary angle, and why, for example, certain functions of angles may become equal to infinity or may become equal to zero and range to a value theoretically of minus infinity.

Attempts have been made to demonstrate the various elementary trigonometric theorems by means of diagrams and the like, but diagrams are subject to the same criticism as tables, in that the variation from one angle to another cannot be adequately depicted without causing confusion.

My invention therefore contemplates overcoming the difficulties above set forth, by the provision of a swingable member, forming one movable side of the angle, in connection with a suitable chart, properly ruled, and inscribed with a stationary line giving the other side of the angle whereby the variations of the line functions corresponding to variations of an angle are clearly and visibly illustrated, and rendered adequately intelligible even to young students, without the necessity for remembering tables of figures or a series of diagrams.

The various objects of my invention will be clear from the description which follows, and from the drawing, in which Fig. 1 is an elevational view of my new device.

Fig. 2 is a bottom plan view thereof.

Fig. 3 is an elevation similar to Fig. 1 of a modified form of the device such as is peculiarly suitable for black-board demonstration.

Fig. 4 is a cross-section of the central part of the device showing a modified form of pivot, and Fig. 5 is a similar view of the same, showing the form of pivot illustrated in Fig. 2.

In that practical embodiment of my invention which I have illustrated by way of example, and referring particularly to Figs. 1 and 2, I have shown a chart as 10, consisting of a preferably flat sheet of suitable material such as celluloid, paper, card-board, wood, metal or the like, adapted to have lines and numerals engraved, stamped, printed or otherwise impressed or inscribed thereon, preferably in contrasting colors to indicate clearly the positive and negative line functions. The chart 10 may be of any suitable outline such as rectangular, circular, elliptical or the like, and is preferably of sufficient extent in both directions to permit the determination of the values of a major part of many of the trigonometric line functions, between the limits of their values.

On the chart 10, I prefer to mark a circle as 11, suitably graduated by means of radial lines 9 to indicate angles having a common vertex at the center 12. A vertical diameter as 13 and a horizontal diameter as 14 divide the circle into the usual four quadrants, the first quadrant being at the upper right of the figure, the second quadrant at the upper left, the third quadrant at the lower left, and the fourth quadrant at the lower right, the right hand half of the horizontal line 14 forming one side, (the stationary side), of all of the angles.

It will be understood that as is usual, in any system of coordinates, vertical and horizontal measurements above or to the right, respectively, of the center or origin 12 are considered as positive measurements, while similar measurements below or to the left of the center or origin are considered negative measurements. It is intended that the positive measurements be distinguished from negative measurements by lines of different colors. Toward this end, not only are the lines colored but the graduations are also marked in contrasting colors, as well as the parts of the pivoted member. For example, the vertical lines 15 in the first and second quadrant extending downwardly from the end of the various radii of the circle to the horizontal diameter 14 are shown in full lines to indicate one color, such as blue, while the corresponding vertical lines 16 in the second and third quadrant are shown in the form of dash and dot lines to indicate a different color, such as red, whereby positive and negative measurements are instantly distinguishable. Similarly, the horizontal lines 17 in the first and fourth quadrants are blue in color, while the corresponding horizontal lines 18 in the second and third quadrant are red in color to indicate negative measurements. One half of the swinging member 25 may be colored blue and the other half red, or the graduations of said halves and the figures may be thus colored.

The upper half of the vertical line 19, tangent to the circle at the right end of the horizontal diameter 14, is colored blue above the line 14, while the lower half is red. The graduations and numerals on said halves are similarly colored. Similarly, the horizontal line 21 tangent to the circle at the end of the vertical diameter 13 is similarly colored blue to the right of the line 13 and red to the left of said line, the graduations on said line 21 being of corresponding colors.

In order, insofar as possible, to eliminate the use of fractions in the determination of the various trigonometric functions, that is, to determine the functions by their line values, the radius of the circle 11 is considered as a unit, in this case 10, and for convenience, said radius is divided into ten equal parts as indicated, each part representing one-tenth of a unit, it being understood that the decimal point is to be inserted before the last digit. Graduations of the same size are used on the vertical line 19 and on the horizontal line 21, though it will be understood that each of the graduations may be further sub-divided as indicated to give more accurate readings.

It will further be understood, of course, that the vertical line 19 and the horizontal line 21 may be extended indefinitely to form a chart 10 of any desired size, so that for example, the tangents and secants of angles approaching 90° and 270° can be determined with fair approximation, and so that the cotangents of angles approaching 0° and 180° may be similarly determined.

It will be remembered that the line value of the tangent of any angle of which the horizontal line 14 is one side, is that much of the vertical line 19 intercepted between the sides of the angle. Also, that the line value of the sine of said angle is the vertical distance 22 between the side 14 and the point of intersection 20 of the side 23 with the circle 11. Similarly, the line value of the cosine is the horizontal distance from the center 12 measured along the line 14 to the vertical line 22. The line value of the cotangent is the distance on the line 21 between the end of the vertical diameter 13 and the point of intersection 24 of the side 23 with said line 21. Similarly, the line value of the cosecant is the distance along the side 23 from the center 12 to the point 24. Similarly, the line value of the secant is the distance from the center 12 measured along the side 23 to the intersection of said side with the line 19.

In order to determine the various functions, and to show clearly and visually, the variation of these functions as the angle changes, and to permit the visualization of the various limits of said functions, I provide the member 25, preferably in the form of a straight edge and pivoted to the chart 10 at the center 12, and forming the movable side 23 of the angle, the left half of the line 14 forming the permanent stationary side of the angle. The pivot 26 is preferably in the form of a suitable friction pivot, whereby the member 25, while swingable about the pivot, is nevertheless frictionally retained in the position into which it is swung. Suitable graduations as 30 are made in the member 25, the zero point of said graduations being the axis of the pivot 26 and coincident with the center 12. The size of the graduations is precisely the same as that of the graduations heretofore mentioned on the lines 14, 19 and 21. A groove as 27 is preferably made along the longitudinal center line of the member 25 in order to render visible the radial lines indicating the angles, and further, to permit the insertion thereinto of a pencil (where the device is made of small size for individual size) or of a piece of chalk (where the device is made of sufficient size for black-board demonstration) so that the desired point of intersection may be marked, or the side 23 of the required angle drawn. It will be understood that the center line of the groove 27 is intended to be so arranged as to coincide with the side 23 of the required angle, whatever that angle may be, when the function is to be determined.

It will also be understood that the line values of the various functions may be read directly from the lines 14, 19 and 21 or on the member 25, as the case may be, and that the color of the graduations or of that part of the line or member on which the line value of the function is read, will give the correct sign of the function indicating whether it is positive or negative by mere inspection.

To more clearly indicate how my invention enables the student to understand and grasp the variations of the trigonometric functions with respect to sign and magnitude as the angle changes, I will take up some specific examples in detail.

It must be remembered that all sines are read by projecting the point of intersection 20 of the center line 23 of the member 25 and the circle 11, upon the line 19 by means of the horizontal lines 17 and 18. The required value is the intercept on the line 19 included between the horizontal projection of the point 20 on the line 19, and the line 14. The cosine is read by projecting the point 20 upon the line 14 by means of the vertical lines 15 and 16. The required value is the distance on the line 14 included between the center 12 and the vertical projection of the point 20 on the line 14.

The tangent is read on the graduations of the line 19 only, and cotangents only on the line 21, since the line values of the tangents and cotangents are not readable upon the graduations on the member 25. All secants and cosecants should always be read on the scales on the member 25 and not on any graduations on the chart itself. This is true for any and all angles from 0° to 360°.

Assuming the position of the member 25 to be that shown in Fig. 1, namely, indicating an angle of 30° in the first quadrant, the sine can be obtained by first locating the intersection of the center line of the member 25 with the circle 11. The line value of the sine of said angle being the vertical distance 22 between the side 14 and the point of intersection 20 of the side 23 with the circle 11, its numerical value is found by projecting the point 20 parallel to the nearest horizontal line 17 on to the blue portion of the vertical line 19. The blue color of that portion of the line 19 which is read to give the line value of the function, indicates at once that the algebraic sign of the sine of the said angle is positive.

The line value of the cosine is the horizontal distance from the center 12 measured along the blue portion of the line 14 to the vertical line 22. The blue color of the pertinent portion of the line 14 indicates the positive sign of the cosine of said angle.

The line value of the tangent of said angle is that much of the blue portion of the line 19 included between the line 14 and the intersection of the line 23 with the line 19. The blue color of the intercepted portion of the line 19 again indicates that the sign of the function is positive.

The line value of the cotangent of said angle is that part of the blue portion of the line 21 included between the vertical line 13 and the intersection 24 of the side 23 with the line 21. Since the intercepted portion is blue, it is clear that the function is positive. Similarly, the line value of the secant is that portion of the side 23 included between the center 12 and the intersection of said side 23 with the line 19 and measured on the graduations of the member 25. Since these graduations are blue, it is clearly seen that the sign is positive.

The line value of the cosecant is the distance along the side 23 from the center 12 to the point 24. Since this function is read on the blue portion of the member 25, its sign must be positive.

Assume now that the member has been rotated in Fig. 1 into the second quadrant to a position corresponding to an angle of 150°. The center line of the member 25 intersects the circle 11 in the second quadrant.

This point of intersection is projected by means of the lines 18 upon the line 19, the line value being given by the distance between the line 14 and the projection of said point of intersection upon the line 19. It is seen at once that values of the sine for all angles in this quadrant are measured on the blue portion of the line 19 and therefore must be positive in sign.

The line value of the cosine is the horizontal distance from the center 12 to the projection of the above-mentioned point of intersection upon the line 14. Since this is measured along the red portion of the line 14, the sign of all cosines in this quadrant is immediately indicated to be negative or minus.

To obtain the tangent, we must first locate the intersection of the member 25 with the line 19. It is to be remembered that the member 25 is assumed to have taken a position corresponding to an angle of 150°. Therefore, the blue portion of the member will not intersect the line 19 at all. The red portion of said member will intersect the line 19 in that portion which is red, at once establishing the sign to be minus and giving the line value as that distance from the line 14 down to this point of intersection.

The blue portion of the arm 25 intersects the red portion of the line 21 also, establishing immediately the line value and minus sign of the cotangents.

The secant is that portion of the side 23 included between the center 12 and the intersection of said side 23 with the line 19. But the blue portion of the member 25 does not intersect the line 19 at all. In this quadrant, therefore, the secant must be measured on the red scale located on the red portion of the member 25. The value of the secant must therefore be negative or minus.

Similarly, the cosecant, determined by the distance along the line 23 from the center 12 to its intersection with the line 21, is measured upon the blue scale on the blue portion of the member 25. Thus its value is readily determined and its sign must be positive or plus.

For purposes of illustration, I have shown various forms of friction pivots for securing the member 25 to the sheet 10. In Figs. 2 and 5, said pivot 26 consists of a head 45, having an axial prong or point 46 projecting downwardly therefrom, a cylindrical shank portion 28 passing through the member 25 and the sheet 10, and a riveted end portion.

In cases where the chart 10 is made of comparatively rigid and hard material such as celluloid or the like, the pivot may take the form of the hollow eyelet 47 (Fig. 4). In any case, the pivot is preferably, though not necessarily, stationary relatively to the chart 10 but the member 25 may swing about the pivot without disturbing it.

The center 12 may be defined on the head of the pivot by a suitable vertical line 31 and an intersecting horizontal line 32 indicating continuations of the lines 13 and 14 respectively, so that measurements may be taken from the center 12 should it become necessary to do so. Since various forms of friction pivots well known in the art may be used for the purpose of securing the member 25 rotatably to the chart, I do not wish to be understood as limiting my invention in any way to the specific form of pivots just shown and described.

The prongs 46 may, if desired, be used to arrange the center 12 over the exact vertex or an angle whose functions are to be determined, being aided toward this end by the horizontal lines 50 and 51 which are continuations of the line 14, and the lines 52 and 53 which are continuations of the line 13.

The device so far explained is suitable either for individual use, as by the student himself, or for black-board demonstration, as will be later explained. When made in small sizes for individual use, the member 25 is preferably made of comparatively rigid transparent material such as celluloid or the like, so that the various graduations and lines on the chart may be visible therethrough. It will be understood that the device, particularly in the individual size, has other uses as well as for the purpose above described. For example, it may be used as a protractor and straight edge combined. It may therefore be used for the graphic solution of triangles by laying off the known sides of the triangle to scale, as by means of the graduated straight edge member 25 and laying off the known angles by arranging the center 12 at the end of the given line, making the line 14 coincident with the given line and then laying off the angle by means of the graduations on the circle 11.

It may also be used to determine the functions of given angles, by placing the lines 14 and 23 respectively coincident with the given sides of the angle.

As illustrated in Fig. 3, I prefer to add a vertical member as 35 to my new device, where the device is to be used for black-board demonstration, though it will be understood that said member 35 may also be added to the device when made for individual use. Said member 35 is pivoted to the member 25 as as 36, being loosely mounted on the pivot 36. The center of the pivot 36 lies at all times on the circumference of the circle 11, no matter which position the rotatable member 25 assumes. The member 35 is further so proportionally arranged as to remain vertical at all times when the chart 10 is arranged, as by hanging it up, in a substantially vertical plane. Not only is said member mounted loosely on the pivot 36, but the lower blue portion 37 of said member is made of much greater length than the upper red portion 38 thereof, so that the weight of the lower portion maintains the member in its vertical position. Said upper red portion 38 is preferably made at least as long as the radius of the circle 11, while the lower blue portion 37 is made at least as long as the diameter of said circle. Graduations 39 of the color corresponding to the part on which said graduations are made, are provided on both portions of the vertical member, said graduations beginning at the center of the pivot 36 and extending upwardly and downwardly.

A groove 40, similar to the groove 27, is made along the middle of the member 35 to allow a piece of chalk to be inserted therethrough for drawing lines to indicate the sines of angles, and the tangents of certain angles. The member 35 is peculiarly suited for showing the limits of, and the variation of the functions between their limits, as the given angle increases or decreases. For example, when the pivot 36 is at the right end of the horizontal line 14, it will be seen immediately from inspection that the sine of the angle 0° becomes equal to zero, and that the cosine of said angle is equal to 1.

As the member 25 is now rotated in a counter-clockwise direction and the angle increases, it will be seen from inspection that the sine increases and the cosine decreases until the cosine becomes 0 for the angle of 90°, and the sine becomes equal to one for said angle. It will also be seen by inspection that neither the sine nor the cosine can become greater than 1, nor less than −1. Similarly, it will be seen at once that the tangent increases from 0 for an angle of 0° to infinity for an angle of 90°, and that the least value of this function is minus infinity. The variations and limits of the other functions may be similarly seen by inspection. It will also be noted by inspection that all the functions from 0° to 90° are positive as indicated by the intersection of the blue part of the member 25 with the blue lines or lines having blue graduations in the first quadrant. It will further be seen by inspection that certain functions become negative as the angle increases from 90° to 180°, since the blue part of the member 25 or the prolongation thereof will then intersect certain red lines. Other elementary trigonometric principles may also be fully and clearly demonstrated by mere inspection. For example, the limits of all the functions can be seen from inspection. In other words, it becomes clear at a glance that the sine of any angle cannot be less than minus one nor greater than plus one, and that the tangent ranges from plus infinity to minus infinity or has values over the entire scale.

It can further be clearly demonstrated that the function of $(0°\pm x)$ equals the function of $(x)$ and that the function of $(180°\pm x)$ equals the function of $(x)$, by merely inspecting the functions of the angles separated by 180°, as by rotating the blue end of the member 25, alternately into the first and third quadrants.

Similarly, the fact that the function of $(90°\pm x)$ and the function of $(270°\pm x)$ equals the co-function of $x$ can be readily noted by merely inspecting the functions of the angle of the proper quadrant into which the blue end of the member 25 is rotated.

It will be understood that for black-board demonstration, the black-board itself may constitute the chart or sheet 10, suitable means being provided for supporting the swingable member 25 and the member 35 pivoted thereto. It will also be understood that in use, the center line of the groove 27 in the blue colored part of the member 25 is made coincident with one side of the angle whose functions are to be determined, the line 14 constituting the other side of the angle. The line values of the functions are determined by the point where the center line of the groove or the prolongation of said center line intersects the circle (as in the case of the sine and cosine) or the line 21, (as in the case of the cosecant and cotangent) or the line 19 (as in the case of the tangent and secant).

For the angle of 30°, as illustrated in Fig. 1, these values are as follows:

| | |
|---|---|
| Sine | 0.50 |
| Cosine | 0.87 |
| Tangent | 0.58 |
| Cotangent | 1.73 |
| Secant | 1.15 |
| Cosecant | 2.00 |
| Vers sine | 0.13 |

It will further be understood that I have provided a simple and inexpensive instrument designed for making clear to a student of average intelligence various elementary trigonometric principles, for demonstrating said principles visually, and for determining with sufficient approximation, the various trigonometric functions of angles from 0° to 360°. It will further be understood that while I have shown and described certain specific embodiments of my invention, the physical structure thereof may be greatly varied as has been previously indicated, such as for example, the material used for the instrument, the structure of the various pivots used therein, the lengths of the various lines, the sizes of the various parts and the like.

I therefore do not wish to be understood as limiting myself to the specific structure shown and described but intend to claim my invention as broadly as may be permitted by the state of the prior art and the scope of the appended claims.

I claim:

1. The combination with a sheet, of a first horizontal line marked on said sheet and indicating one side of all angles, a circle on the sheet of which said line is a radius, a series of angles marked in said circle, all having a common vertex at the inner end of said line, a second horizontal line tangent to the uppermost point of the circle, to determine cosecants and cotangents of the angle that part of said second line on one side of the point of tangency being of one color to indicate positive cotangents, the other part on the other side of the point of tangency being of a contrasting color to indicate negative cotangents, a vertical line tangent to the circle at the right hand end of the first line to determine tangents and secants of the angle, the upper part of said vertical line being of said one color to indicate positive tangents and the lower half of the vertical line being of said contrasting color to indicate negative tangents, a swingable member of greater length than the diameter of the circle pivoted at its center and at the center of the circle to the sheet, one half of said swingable member being distinguished by said one color to correspond with the upper part of the vertical line, and the other half of said member being distinguished by said contrasting color, said member determining the value and signs of the secants and cosecants of the angles, the signs of the secants and cosecants being determined by the color of that part of the member which intersects the vertical and horizontal tangent lines respectively.

2. In a device of the character described, a sheet, markings on said sheet to determine the line functions of angles from 0° to 360°, said markings including a circle, a vertical and a horizontal line tangent to the circle, and a horizontal radius, said radius being divided into ten units and said vertical and horizontal lines being graduated with sub-divisions each equal in extent to said units, the parts of said lines being colored in contrasting colors to indicate when the sine, tangent and cotangent line functions are positive or negative, a swingable member extending a substantially equal distance on each side of the center of the circle and pivoted to the sheet, and swingable into position to form the side of any angle between 0° and 360° in cooperation with said radius, and graduations on said member beginning at the axis of the pivot thereof and extending outwardly in both directions, said graduations comprising units of the same size as said hereinbefore-mentioned units, the graduations of said member in one direction being of one of said contrasting colors and the graduations of said member in the other direction being of the other contrasting color to indicate when the secants and cosecants are positive or negative.

3. In a device of the character described, markings in contrasting colors indicating line values and signs of trigonometric functions, including a line divided into ten units, a first member pivoted to one end of said line, said member being swingable over said markings and having contrasting colors on each side respectively of the axis of rotation thereof, and being graduated in said units outwardly of said axis and cooperating with said markings to determine the line values and signs of the secant and cosecant readable on said member, and the line values and signs of the other functions of the angle subtended between said member and said line and readable on said markings, and a second member pivoted to the first member at a distance from the center of rotation of the first member equal to ten units, the upper part of the second member above its pivot being substantially ten units in length and the lower part of said second member being substantially twenty units in length, the color of the upper part corresponding with the negative indicating colors of the markings to indicate negative signs of the sine readable on said upper part, and the color of the lower part indicating corresponding positive sines readable on said lower part.

4. In a device for teaching by inspection the line values of, and the changes in magnitude and algebraic sign of the trigonometric functions corresponding to variations in angles from 0° to 360°, a sheet, a circle on the sheet, graduated radial lines at the circumference of the circle indicating angles from 0° to 360°, a horizontal radius subdivided into ten units and being of one color to indicate the positive sign and value of cosines, a straight-line extension of said radius of a contrasting color to indicate the negative sign and value of cosines, a graduated line tangent to said circle and perpendicular to said graduated radius, the upper part of said tangent line being of one color to indicate positive tangents and sines and the lower part below the point of tangency being of said contrasting color to indicate negative tangents and sines, a second graduated line tangent to the upper half of the circle and parallel to the said graduated radius, and colored in said one color on one side of the point of tangency to indicate positive cotangents, the other part of said last-mentioned tangent line on the other side of the point of tangency being of the contrasting color to indicate negative cotangents, a rotatable member, extending a substantially equal distance on each side of the center of the circle and pivoted to the center of said circle, that half of said rotatable member on one side of the center being of said one color and the other half on the other side of the center being of said contrasting color to indicate when the sign of secants and cosecants read along said member are positive or negative, the secants and cosecants being positive when read on the first-mentioned half of the member and negative when read on the other half, a series of vertical lines extending within the circle from the points of intersection of the radial lines with the circle, said vertical lines intersecting the horizontal diameter, the vertical lines in the first and second quadrants of the circle being of said one color to indicate the positive algebraic sign of the sines and the vertical lines of the third and fourth quadrants being of said contrasting color to indicate the negative algebraic sign of the sines, horizontal lines drawn from the vertical tangent line towards the circumference of the circle, the horizontal lines in the first and fourth quadrants being of said one color to indicate the positive algebraic sign of the cosine and the horizontal lines in the second and third quadrants of said contrasting color to indicate the negative algebraic sign of the cosines, and a second rotatable member pivoted directly to the first mentioned rotatable member at the circumference of the circle and adapted to remain vertical at all times under the influence of gravity when the sheet is arranged in a substantially vertical plane, one half of the second member having graduations thereon of said one color to indicate positive sines, the other half being similarly graduated and of said contrasting color to indicate negative sines.

HAROLD I. SHIMBERG.